(12) United States Patent
Baek et al.

(10) Patent No.: US 9,419,925 B2
(45) Date of Patent: *Aug. 16, 2016

(54) DEVICE AND METHOD FOR MANAGING EVENT INFORMATION IN WIRELESS TERMINAL

(71) Applicant: Samsung Electronics Co., Ltd., Suwon-si, Gyeonggi-do (KR)

(72) Inventors: Su-A Baek, Gumi-si (KR); Ji-Won Suk, Daegu (KR); Seung-Chul Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,202

(22) Filed: Nov. 25, 2013

(65) Prior Publication Data

US 2014/0089434 A1 Mar. 27, 2014

Related U.S. Application Data

(63) Continuation of application No. 11/390,101, filed on Mar. 28, 2006, now Pat. No. 8,594,560.

(30) Foreign Application Priority Data

Apr. 1, 2005 (KR) .................... 10-2005-0027724

(51) Int. Cl.
*H04H 7/00* (2006.01)
*H04L 12/58* (2006.01)
*G06Q 10/10* (2012.01)
(Continued)

(52) U.S. Cl.
CPC .............. *H04L 51/08* (2013.01); *G06F 3/0482* (2013.01); *G06Q 10/109* (2013.01); *H04M 1/72566* (2013.01); *H04M 1/72547* (2013.01)

(58) Field of Classification Search
USPC ........................................ 455/3.05
See application file for complete search history.

(56) References Cited

U.S. PATENT DOCUMENTS 6,064,975 A    5/2000  Moon et al.
6,466,236 B1 * 10/2002 Pivowar et al. ............. 715/835
7,398,061 B2   7/2008  Mousseau
(Continued)

FOREIGN PATENT DOCUMENTS

CN    1208895 A    2/1999
CN    1277692 A   12/2000
(Continued)

OTHER PUBLICATIONS

Palmone, Inc., "Using Your Treo 650 Smartphone", Copyright 2004, pp. 1-200, XP-002393281.

*Primary Examiner* — Olumide T Ajibade Akonai
*Assistant Examiner* — Randy Peaches
(74) *Attorney, Agent, or Firm* — Jefferson IP Law, LLP

(57) ABSTRACT

A device and method is provided for managing event information in a wireless terminal. The device includes a controller for controlling and sorting at least one event information based on a menu, and providing an identifier corresponding to the menu on a date-by-date basis, and a displaying unit for displaying event information on the date-by-date basis, using the identifier. The method includes the steps of sorting at least one event information by a menu, and displaying event information on a date-by-date basis, using an identifier corresponding to the menu.

18 Claims, 13 Drawing Sheets

(51) Int. Cl.
*G06F 3/0482* (2013.01)
*H04M 1/725* (2006.01)

(56) References Cited

U.S. PATENT DOCUMENTS

| | | | |
|---|---|---|---|
| 7,487,458 B2 | 2/2009 | Jalon et al. | |
| 2002/0078070 A1 | 6/2002 | Eshelman et al. | |
| 2003/0058287 A1* | 3/2003 | Stanley .................. | 345/864 |
| 2004/0113928 A1 | 6/2004 | Kobayashi et al. | |
| 2005/0043060 A1 | 2/2005 | Brandenberg et al. | |
| 2005/0216250 A1 | 9/2005 | Simmon et al. | |

FOREIGN PATENT DOCUMENTS

| | | |
|---|---|---|
| CN | 1404593 A | 3/2003 |
| CN | 1495626 A | 5/2004 |
| EP | 0 358 301 A2 | 3/1990 |
| GB | 2 328 533 A | 2/1999 |
| KR | 10-2002-0078390 A | 10/2002 |
| TW | 533364 B | 5/2003 |
| TW | 563046 B | 11/2003 |
| WO | 99/21100 A1 | 4/1999 |
| WO | 03/077461 A2 | 9/2003 |

* cited by examiner

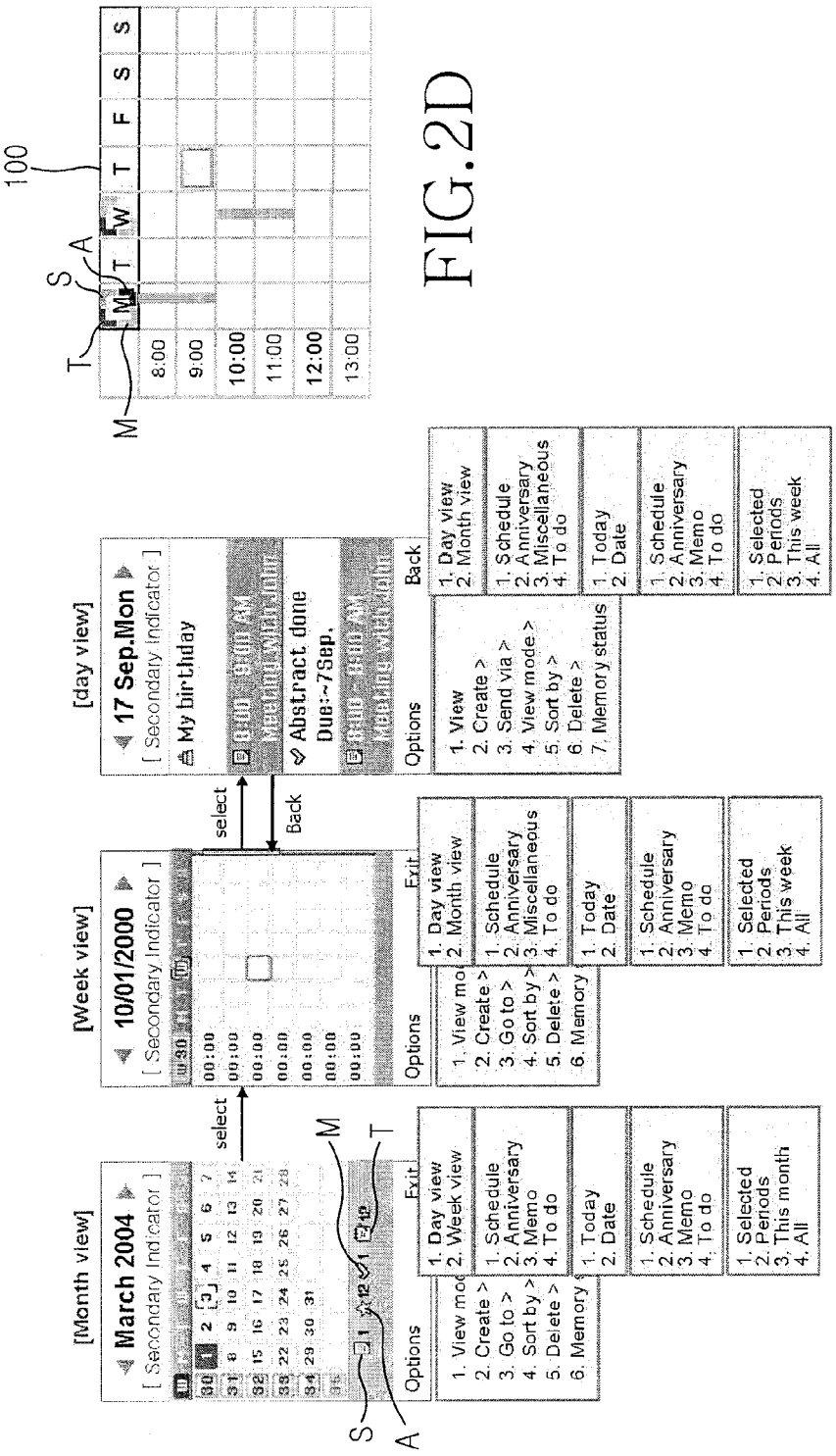

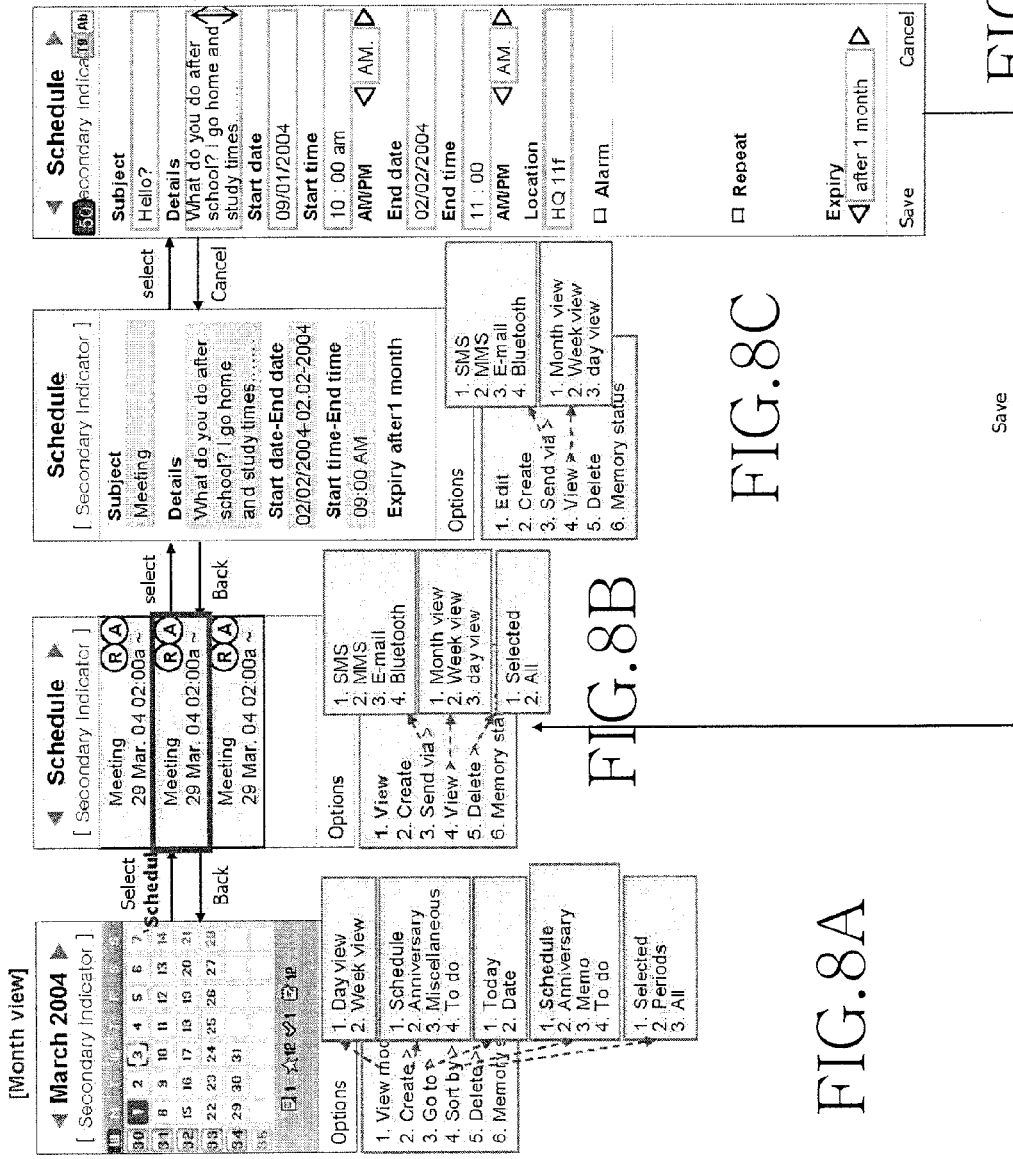

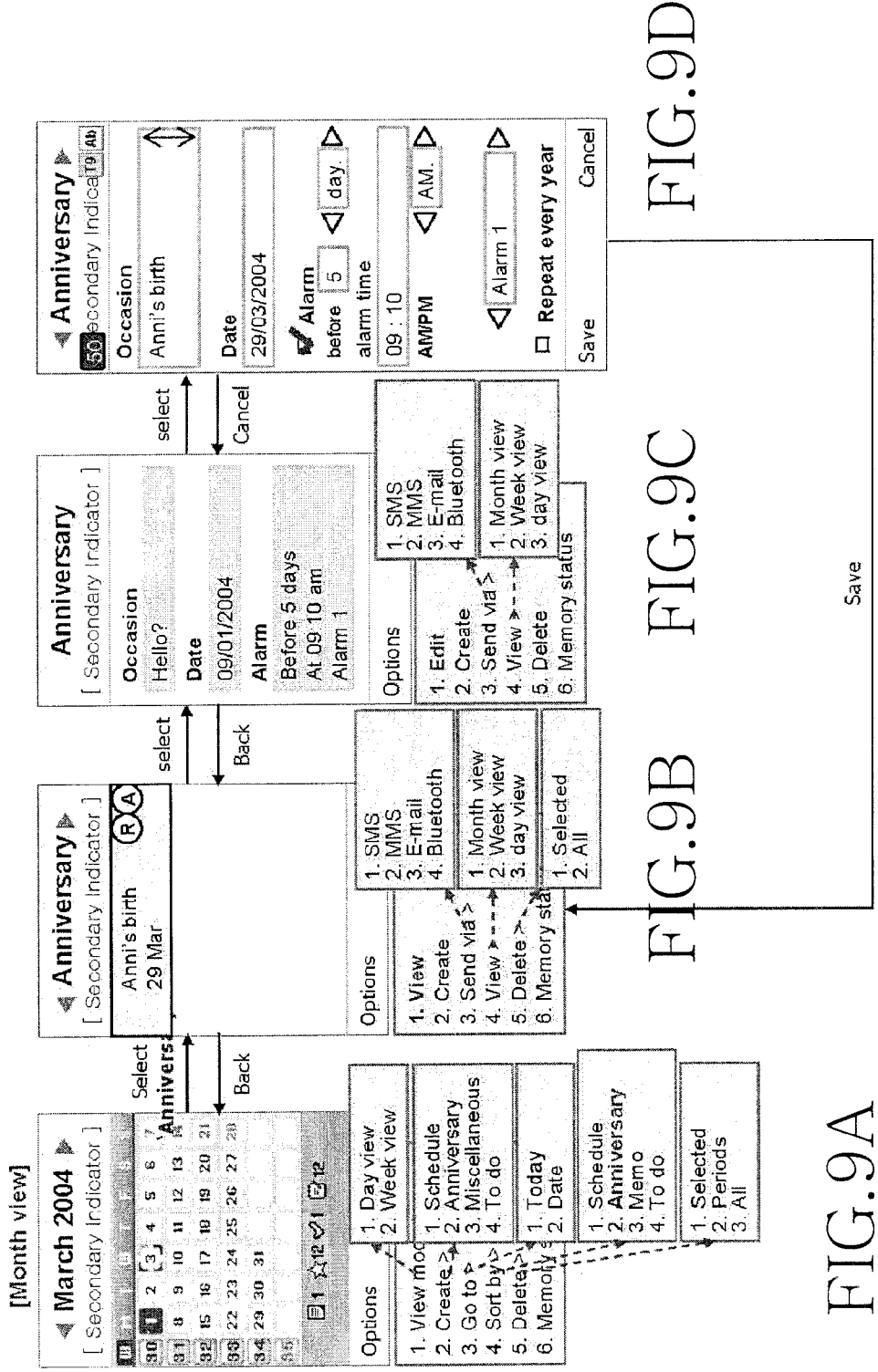

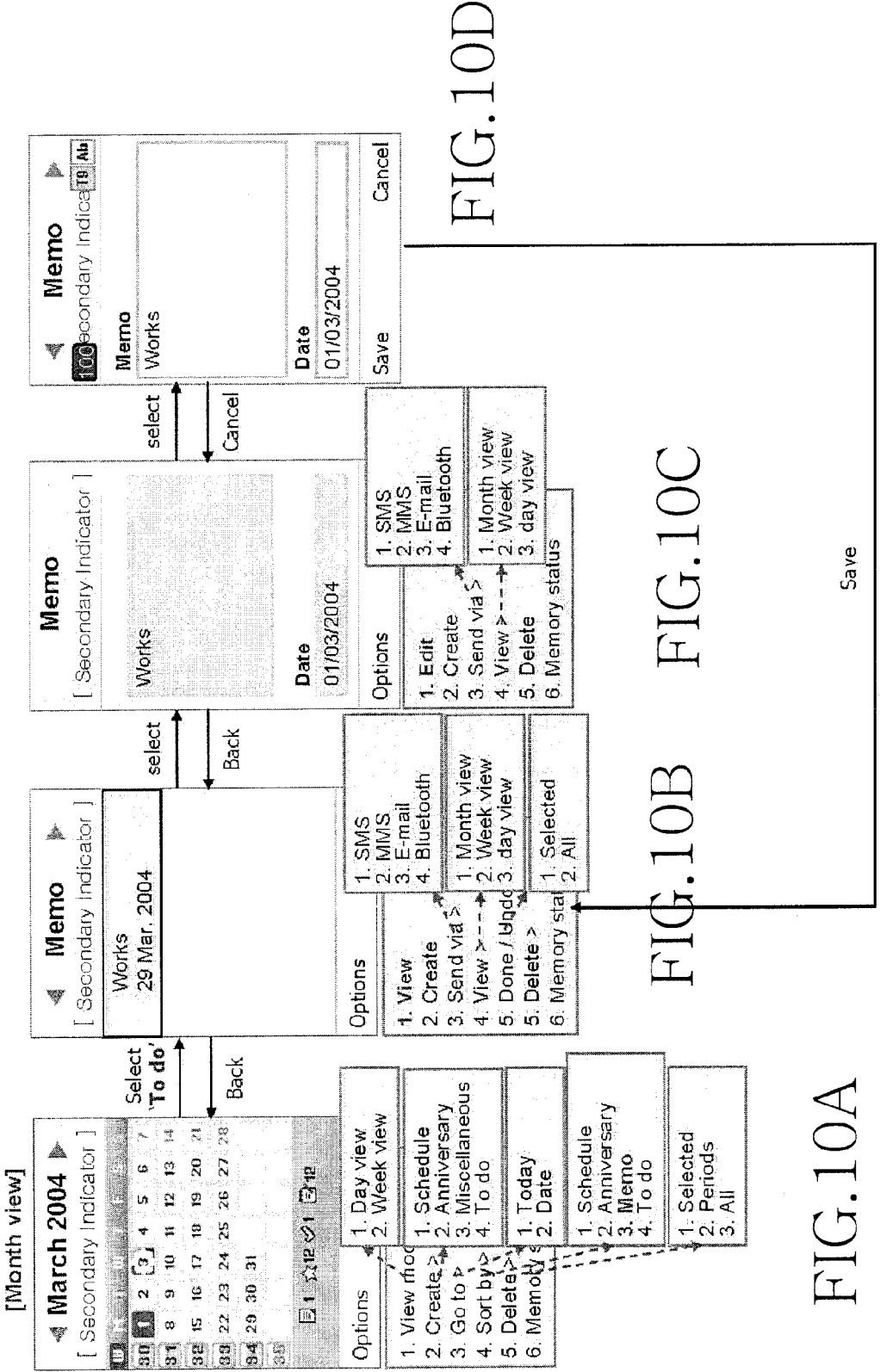

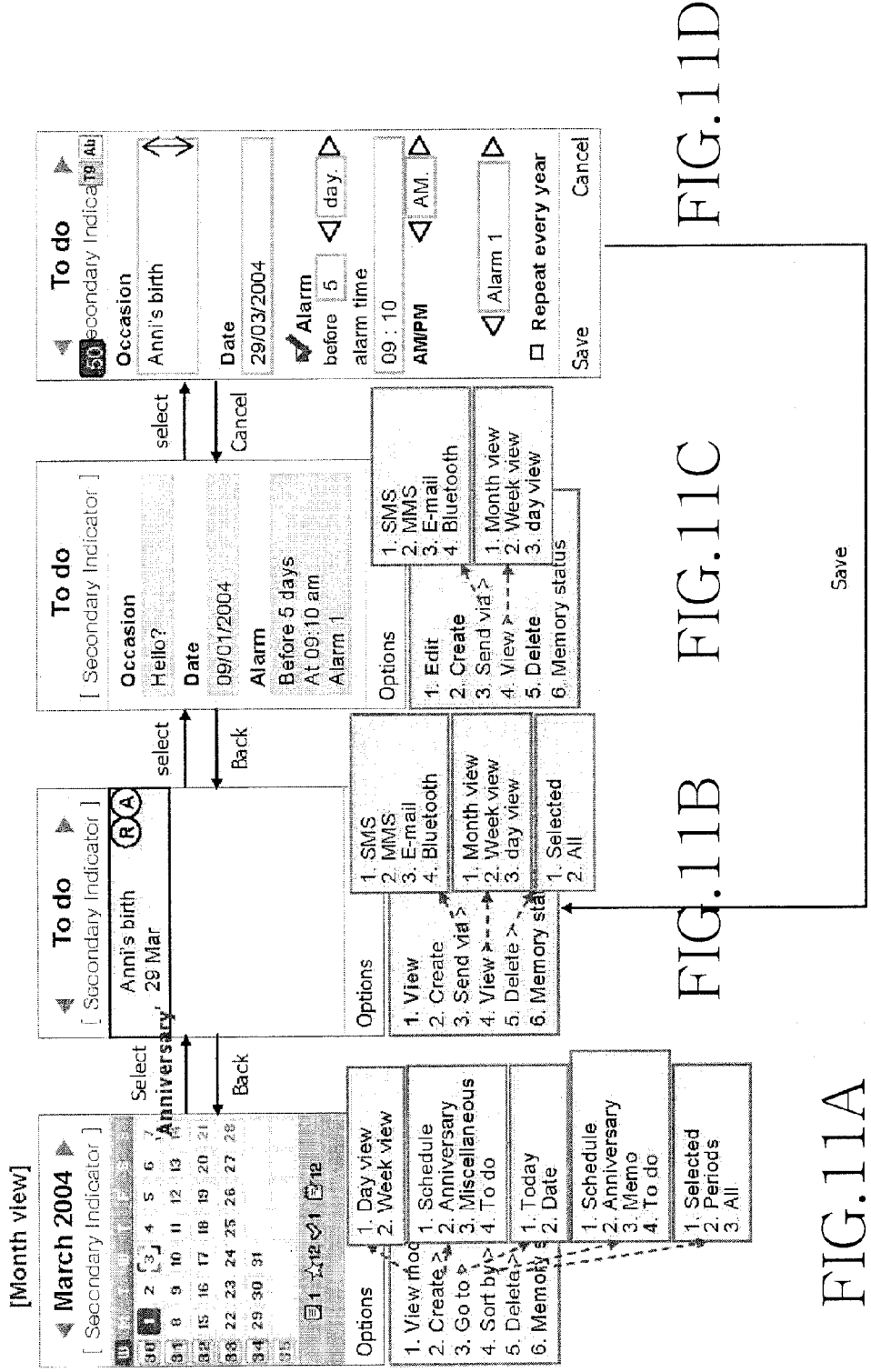

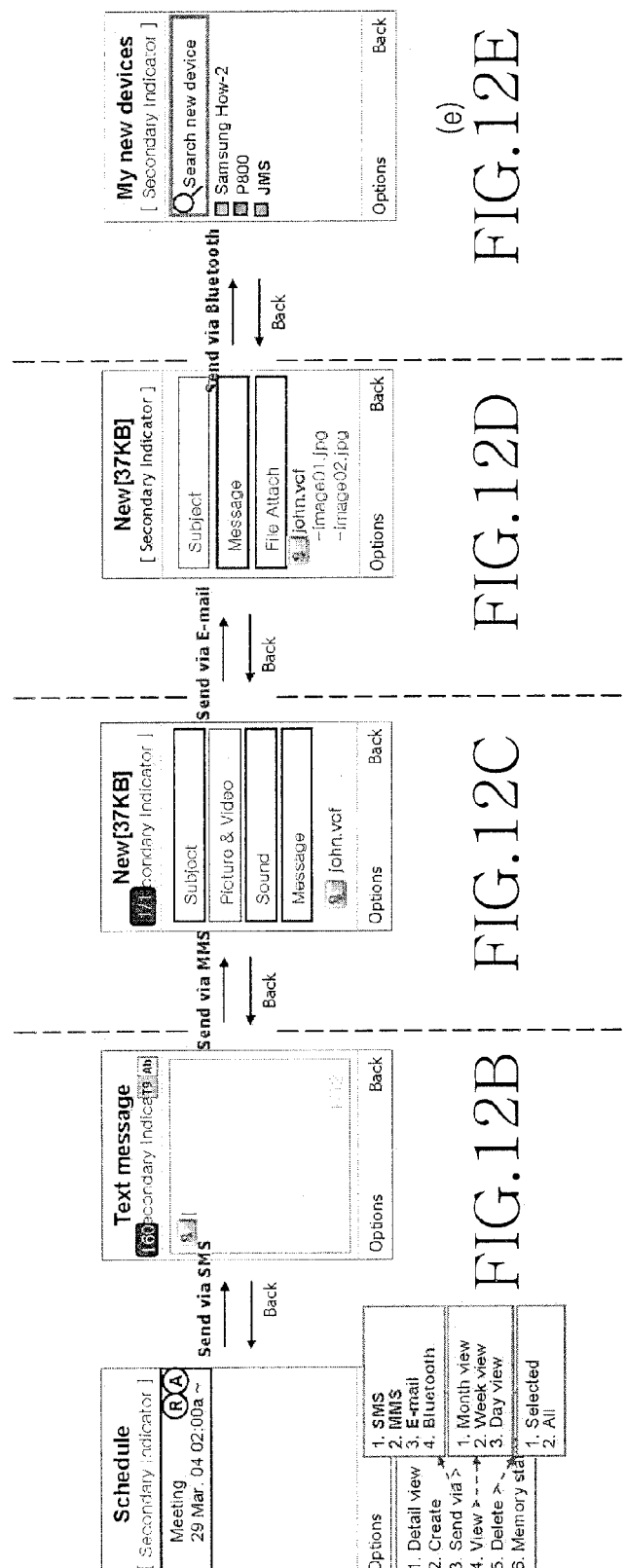

DEVICE AND METHOD FOR MANAGING EVENT INFORMATION IN WIRELESS TERMINAL

CROSS-REFERENCE TO RELATED APPLICATIONS

This application is a continuation of U.S. patent application Ser. No. 11/390,101 filed on Mar. 28, 2006, which claims the benefit under 35 U.S.C. §119(a) of Korean Patent Application filed in the Korean Intellectual Property Office on Apr. 1, 2005 and assigned Serial No. 10-2005-0027724, the entire disclosure of which is incorporated herein by reference.

BACKGROUND OF THE INVENTION

1. Field of the Invention

The present invention relates generally to a method for managing event information in a wireless terminal. In particular, the present invention relates to a device and method for simply and conveniently managing event information such as various schedules, anniversaries, memos, and TO-DO items in a wireless terminal.

2. Description of the Related Art

A wireless terminal typically includes various service functions in addition to a basic call service function. Among them, in particular, event information functions such as schedules, memos, and anniversaries, provide a convenience by informing a user of the wireless terminal of a registered specific date in an automatic manner.

However, the user is required to convert the wireless terminal to display a menu of the event information in order to register the event information. For example, when the user intends to input the schedule and anniversary on the same date, there is an inconvenience in that the user is required to convert the wireless terminal to display a schedule menu and register a schedule of the corresponding date and then, is required to again convert the wireless terminal to display an anniversary menu and register an anniversary of the corresponding date. Further, there is an inconvenience in that the user is required to convert the wireless terminal to display the menus of the respective event information, in order to display the registered event information.

Accordingly, a need exists for a device and method to simply and conveniently manage event information in a wireless terminal.

SUMMARY OF THE INVENTION

It is, therefore, an object of embodiments of the present invention to substantially solve the above and other problems, and provide a device and method for simply and conveniently managing event information such as various schedules, anniversaries, memos, and TO-DO items in a wireless terminal.

To achieve the above and other objects, a device is provided for managing event information in a wireless terminal, the device comprising a controller for controlling and sorting at least one event information based on a menu, and providing an identifier corresponding to the menu on a date-by-date basis, and a displaying unit for displaying event information on the date-by-date basis, using the identifier.

According to another aspect of embodiments of the present invention, a method is provided for managing event information in a wireless terminal, the method comprising the steps of sorting at least one event information by a menu, and displaying event information on a date-by-date basis, using an identifier corresponding to the menu.

According to another aspect of embodiments of the present invention, a method is provided for managing event information in a wireless terminal, the method comprising the steps of displaying a view mode representing event information in the wireless terminal, and displaying event information of the view mode using an identifier corresponding on a menu-by-menu basis.

BRIEF DESCRIPTION OF THE DRAWINGS

The above and other objects, features and advantages of embodiments of the present invention will become more apparent from the following detailed description when taken in conjunction with the accompanying drawings, in which:

FIGS. 2A-2D illustrate a view mode of an exemplary wireless terminal according to an embodiment of the present invention;

FIGS. 8A-8D illustrate a process of "Sort by schedule" as event information in an exemplary wireless terminal according to an embodiment of the present invention;

FIGS. 9A-9D illustrate a process of "Sort by anniversary" as event information in an exemplary wireless terminal according to an embodiment of the present invention;

FIGS. 10A-10D illustrate a process of "Sort by memo" as event information in an exemplary wireless terminal according to an embodiment of the present invention;

FIGS. 11A-11D illustrate a process of "Sort by TO-DO" as event information in an exemplary wireless terminal according to an embodiment of the present invention;

FIGS. 12A-12E illustrate a process of sending event information in an exemplary wireless terminal according to an embodiment of the present invention.

Throughout the drawings, like reference numerals will be understood to refer to like parts, components and structures.

DETAILED DESCRIPTION OF THE EXEMPLARY EMBODIMENTS

Figure 1:
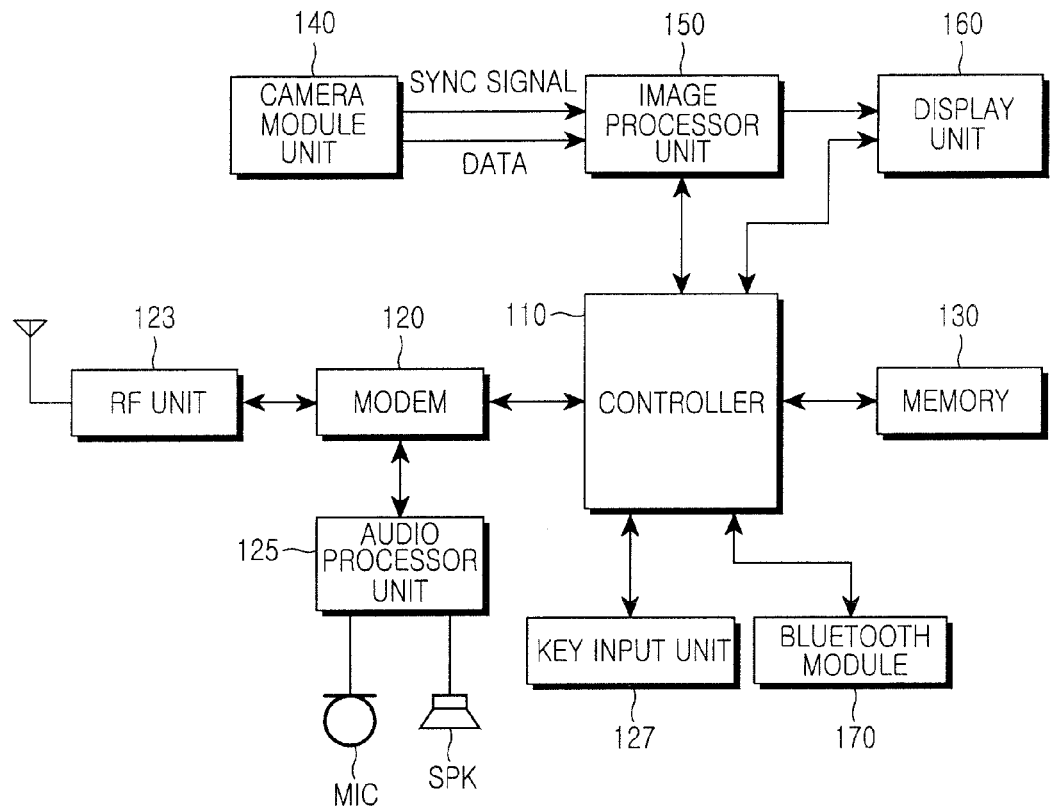
FIG. 1 illustrates a construction of an exemplary wireless terminal according to an embodiment of the present invention.

A number of exemplary embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

FIG. 1 illustrates a construction of an exemplary wireless terminal including a camera according to an embodiment of the present invention.

Referring to FIG. 1, the wireless terminal comprises a controller 110, a modem 120, a radio frequency (RF) unit 123, an audio processor 125, a key input unit 127, a memory 130, a camera module unit 140, an image processor unit 150, a display unit 160, a Bluetooth module 170, and at least one of a microphone MIC and a speaker SPK. The radio frequency (RF) unit 123 performs a wireless communication of the wireless terminal. The RF unit 123 comprises an RF transmitter for up-converting a frequency of a transmission signal and amplifying the transmission signal, and an RF receiver for low-noise amplifying a reception signal and down-converting a frequency of the reception signal. The modulator/demodulator (MODEM) 120 comprises a transmitter for encoding and modulating the transmission signal, and a receiver for demodulating and decoding the reception signal. The audio processor unit 125 can comprise a COder/DECoder (CODEC). The codec comprises a data codec for processing packet data, and an audio codec for processing an audio signal such as voice. The audio processor unit 125 receives a digital audio signal from the modem 120, converts the received digital audio signal into an analog audio signal through the audio codec, and reproduces the analog audio signal. The audio processor unit 125 also receives an analog audio signal generated from the microphone MIC, converts the received analog audio signal into a digital audio signal through the audio codec, and transmits the digital audio signal to the modem 120. The codec can be provided separately or can be included in the controller 110.

The memory 130 can comprise a program memory and a data memory. The program memory can store programs for controlling a general operation of the wireless terminal, and programs for controlling registration and management of event information in the wireless terminal according to an embodiment of the present invention. The data memory temporarily stores data generated in the execution of the programs. The memory 130 preferably registers and stores a variety of event information such as schedules, anniversaries, memos, and TO-DO items according to an embodiment of the present invention.

The controller 110 controls the general operation of the wireless terminal. The controller 110 can also comprise the modem 120 and the codec. The controller 110 controls and displays the event information in a month view mode, a week view mode, and a day view mode, but is not limited thereto. The controller 110 controls registration, sort, "Go to," sending, and deletion functions of event information, while controlling event information general operations according to an embodiment of the present invention.

The camera module unit 140 comprises a camera sensor for photographing image data and converting a photographed light signal into an electric signal, and a signal processor for converting an analog image signal photographed in the camera sensor into digital data. The camera sensor is preferably embodied as a charge-coupled device (CCD) sensor, and the signal processor can be embodied as a digital signal processor (DSP), but each are not limited thereto. The camera sensor and the signal processor can be embodied in an integral component or in separate components.

The image processor unit 150 generates screen data for displaying the image signal output from the camera module unit 140. The image processor unit 150 receives the image signal from the camera module unit 140, processes the received image signal on a per-frame basis, and outputs frame image data adapted to a characteristic and size of the display unit 160. The image processor unit 150 including an image codec, compresses the frame image data displayed on the display unit 160 in a predetermined type or restores the compressed frame image data into original frame image data. The image codec can be a joint photographic experts group (JPEG) codec, a motion picture experts group-4 (MPEG4) codec, or a Wavelet codec, but is not limited thereto. The image processor unit 150 preferably includes a function of an on screen display (OSD), and can output OSD data depending on a size of a screen displayed under the control of the controller 110.

The display unit 160 receives the image signal from the image processor unit 150 and displays the received image signal on a screen, and receives user data from the controller 110 and displays the received user data on the screen. The display unit 160 can employ a liquid crystal display (LCD), but is not limited thereto. In this case, the display unit 160 can further comprise an LCD controller, a memory for storing the image data, and an LCD element. In the case where the LCD is embodied as a touch screen type, the LCD can be also operate as an input unit. Further, the display unit 160 displays event information in at least one of the month view mode, week view mode, and day view mode according to an embodiment of the present invention.

The key input unit 127 comprises input keys for inputting numeral and character information, and function keys for setting a variety of functions.

A procedure of managing event information in an exemplary wireless terminal will now be described in detail with reference to the drawings. In an exemplary embodiment of the present invention, a description will now be made with a menu of event information exemplified as the schedule, the anniversary, the memo, and the TO-DO items.

FIGS. 2A-2D illustrate a view mode of an exemplary wireless terminal according to an embodiment of the present invention.

An operation of the view mode will now be described with reference to FIGS. 2A-2D. When "calendar" is selected from a menu of the wireless terminal, the controller 110 detects the selection of the "calendar" and displays the event information in the month view mode as shown in FIG. 2A. In an exemplary embodiment of the present invention, a description will be made on the assumption for example, that the month view mode is a default value. In the month view mode, the menu and the number of times of registration of the registered event information are displayed on a corresponding month, by a numeral and an icon corresponding to the numeral. As shown in FIG. 2A, an icon (S) representing the schedule event information, an icon (A) representing the anniversary event information, an icon (M) representing memo event information, and an icon (T) representing the TO-DO event information, are displayed correspondingly to the number of times of the registration.

If "Week view" is selected from a menu of the view mode in the month view mode, the controller 110 detects the selection of the "Week view" and displays a week view mode as shown in FIG. 2B. If "Day view" is selected in the week view mode, the controller 110 detects the selection of the "Day view" and displays a day view mode as shown in FIG. 2C. If "Month view" is selected in the day view mode, the controller 110 detects the selection of the "Month view" and displays a month view mode as shown in FIG. 2A.

In the selection of the view mode, whenever a predetermined key is pressed, the month view mode of FIG. 2A, the week view mode of FIG. 2B, and the day view mode of FIG. 2C including a selected day, can be repeatedly displayed.

In the week view mode of FIG. 2B, corresponding dates of one week can be sorted and registered by time and, as shown in FIG. 2D, the menu 100 of the registered event information is displayed at a corresponding time of a corresponding date. In the menu 100 of the event information of FIG. 2D, a timetable of the registered schedule is displayed.

As shown in FIG. 2D, the menu of the registered event information can be displayed at a weekday corresponding to a corresponding date. In an exemplary embodiment of the present invention as shown in FIG. 2D, the menu of the registered event information can be colored and distinguished, such as distinguishing the icon (S) for indicating the menu of the schedule event information by using a blue color, distinguishing the icon (A) for indicating the menu of the anniversary event information by using an orange color, distinguishing the icon (M) for indicating the menu of the memo event information by using a green color, and distinguishing the icon (T) for indicating the menu of the TO-DO event information by using a red color.

Figures 3A, 3B, 3C:
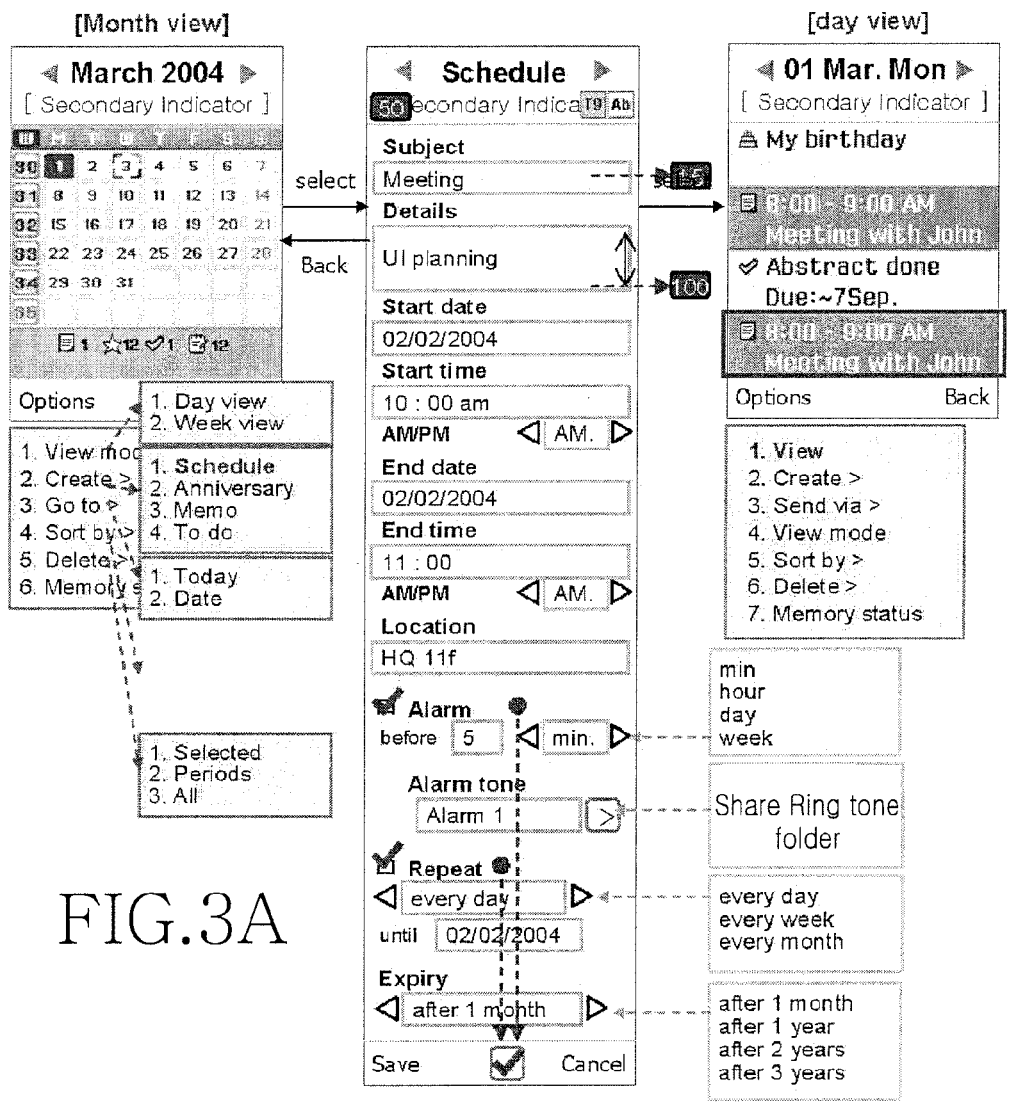
FIGS. 3A-3C illustrate a process of registering a schedule as event information in an exemplary wireless terminal according to an embodiment of the present invention.
Figures 4A, 4B, 4C, 4D:
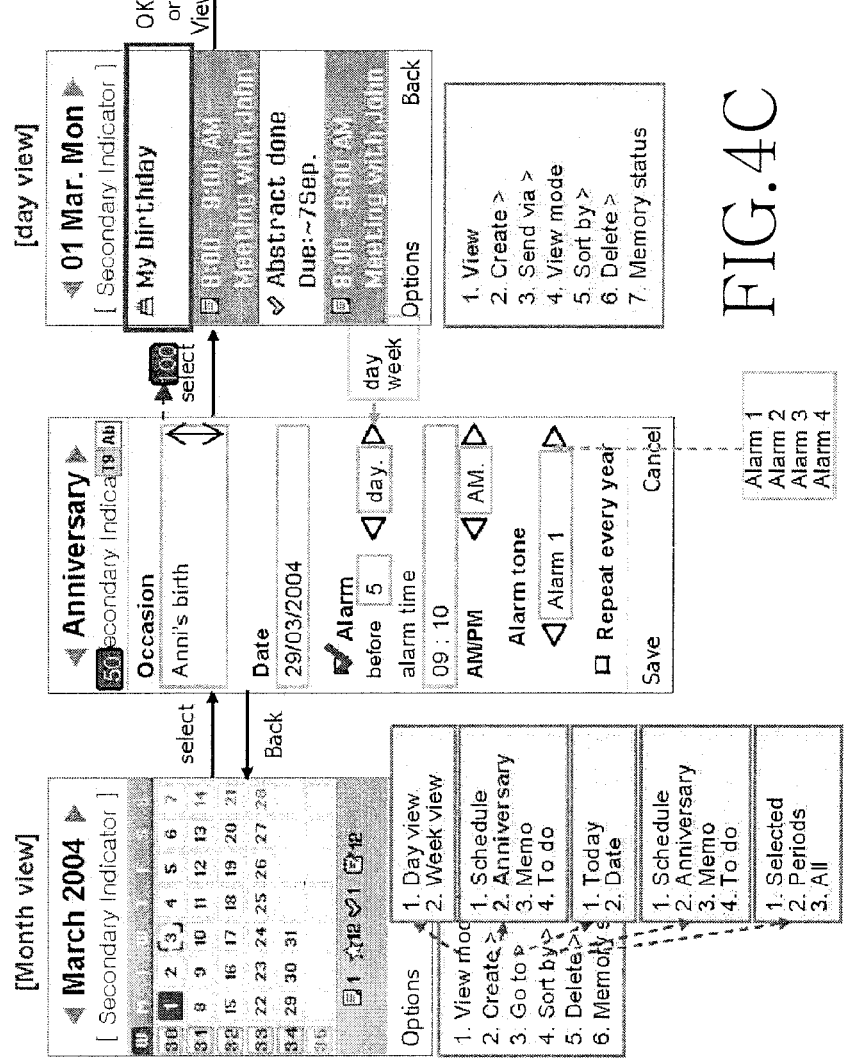
FIGS. 4A-4D illustrate a process of registering an anniversary as event information in an exemplary wireless terminal according to an embodiment of the present invention.
Figures 5A, 5B, 5C:
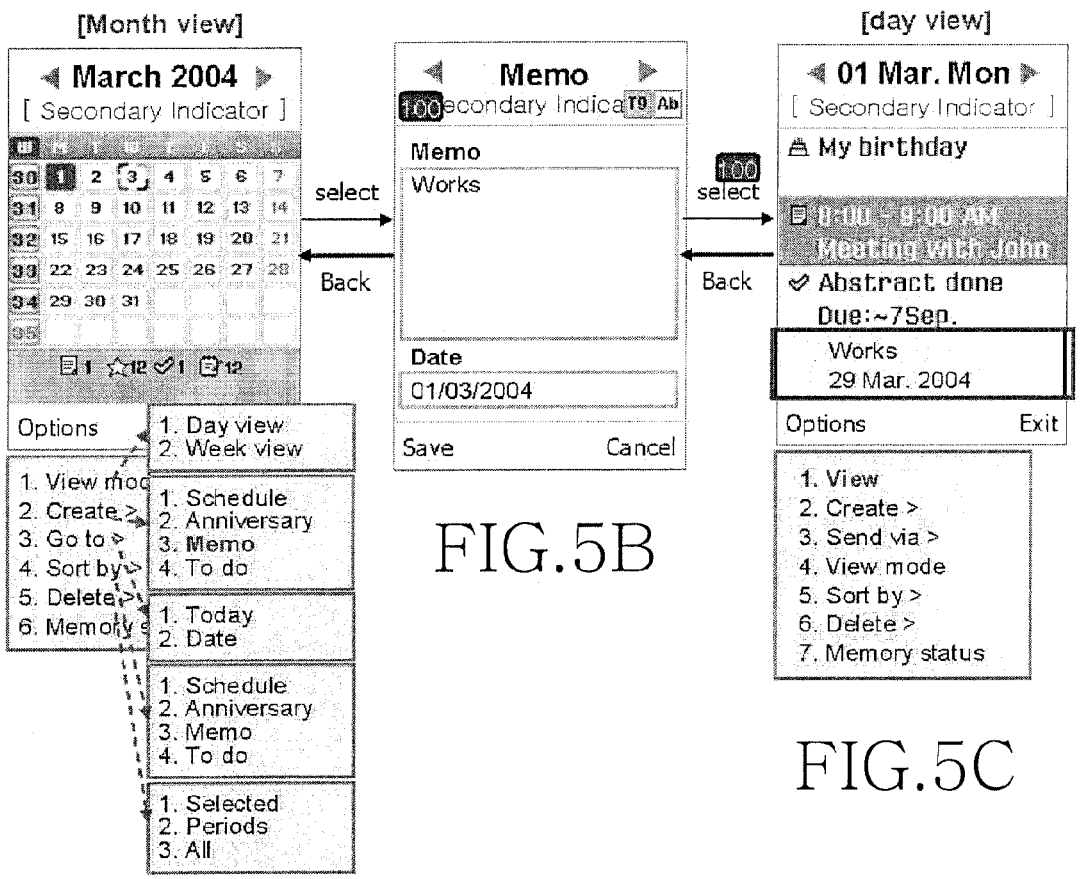
FIGS. 5A-5C illustrate a process of registering a memo as event information in an exemplary wireless terminal according to an embodiment of the present invention.
Figure 6A:
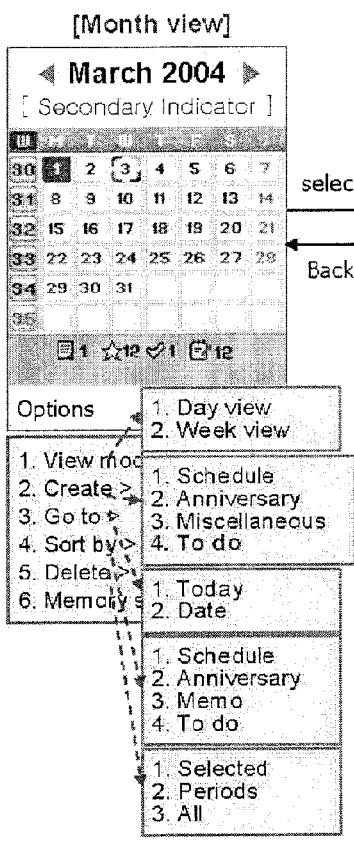
FIGS. 6A-6C illustrate a process of registering a TO-DO item as event information in an exemplary wireless terminal according to an embodiment of the present invention.
Figure 6B:
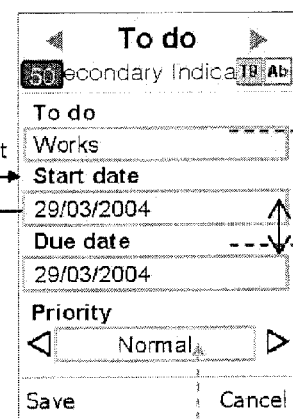
Figure 6C:
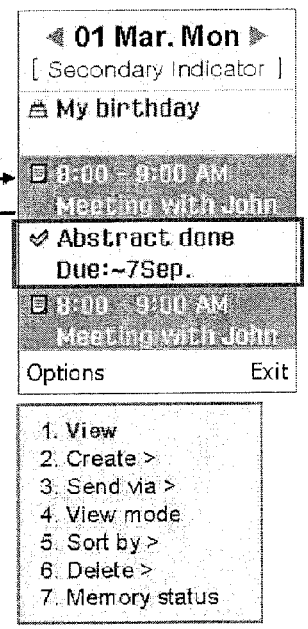

FIGS. 3A-3C, FIGS. 4A-4D, FIGS. 5A-5C, and FIGS. 6A-6C illustrate processes of registering the event information in an exemplary wireless terminal according to an embodiment of the present invention. FIGS. 3A-3C illustrate a process of registering the schedule as the event information in an exemplary wireless terminal according to an embodiment of the present invention, FIGS. 4A-4D illustrate a process of registering the anniversary as the event information in an exemplary wireless terminal according to an embodiment of the present invention, FIGS. 5A-5C illustrate a process of registering the memo as the event information in an exemplary wireless terminal according to an embodiment of the present invention, and FIGS. 6A-6C illustrate a process of registering the TO-DO item as the event information in an exemplary wireless terminal according to an embodiment of the present invention.

The process of registering the schedule as the event information will now be described with reference to FIGS. 3A-3C. If schedule registration ("create"→"Schedule") is selected in the month view mode as shown in FIG. 3A, the controller 110 detects the selection of the schedule registration and converts to a schedule registration mode as shown in FIG. 3B. Upon completion of the registration of a corresponding schedule in FIG. 3B, the controller 110 detects the registration of the corresponding schedule and converts to the day view mode corresponding to today as shown in FIG. 3C. FIG. 3C can be changed depending on user's setting.

Next, the process of registering the anniversary as the event information will now be described with reference to FIGS. 4A-4D. If anniversary registration ("create"→"Anniversary") is selected in the month view mode as shown in FIG. 4A, the controller 110 detects the selection of the anniversary registration and converts to an anniversary registration mode as shown in FIG. 4B. Upon completion of the registration of a corresponding anniversary in FIG. 4B, the controller 110 detects the completion of the registration and converts to the day view mode corresponding to today as shown in FIG. 4C. FIG. 4C can be changed depending on the user's setting.

If a corresponding schedule is selected from the menu of the event information displayed in the day view mode as shown in FIG. 4C, the controller 110 detects the selection of the corresponding schedule and displays details of the selected corresponding schedule as shown in FIG. 4D. In the details of the corresponding schedule displayed in FIG. 4D, the user can convert the wireless terminal to an edit mode, and edit the corresponding schedule.

Next, the process of registering the memo as the event information will now be described with reference to FIGS. 5A-5C. If memo registration ("create"→"Memo") is selected in the month view mode as shown in FIG. 5A, the controller 110 detects the selection of the memo registration and converts to a memo registration mode as shown in FIG. 5B. Upon completion of registration of a corresponding memo in FIG. 5B, the controller 110 detects the completion of the registration and converts to the day view mode corresponding to today as shown in FIG. 5C. FIG. 5C can be changed depending on the user's setting.

Next, the process of registering the TO-DO item as the event information will be described with reference to FIGS. 6A-6C. If TO-DO registration ("create"→"To do") is selected in the month view mode as shown in FIG. 6A, the controller 110 detects the selection of the TO-DO registration and converts to a TO-DO registration mode as shown in FIG. 6B. Upon completion of registration of a corresponding TO-DO in FIG. 6B, the controller 110 detects the completion of the registration and converts to the day view mode corresponding to today as shown in FIG. 6C. FIG. 6C can be changed depending on the user's setting.

After the event information is registered through the above processes, if it is currently a day when a corresponding event occurs, the controller 110 detects that it is the day when the corresponding event occurs, and controls a function to inform the display unit 160 of the occurrence of the corresponding event and display the corresponding event information.

FIGS. 7A-7D illustrate a process of "Go to" in an exemplary wireless terminal according to an embodiment of the present invention.

Figures 7A, 7B:
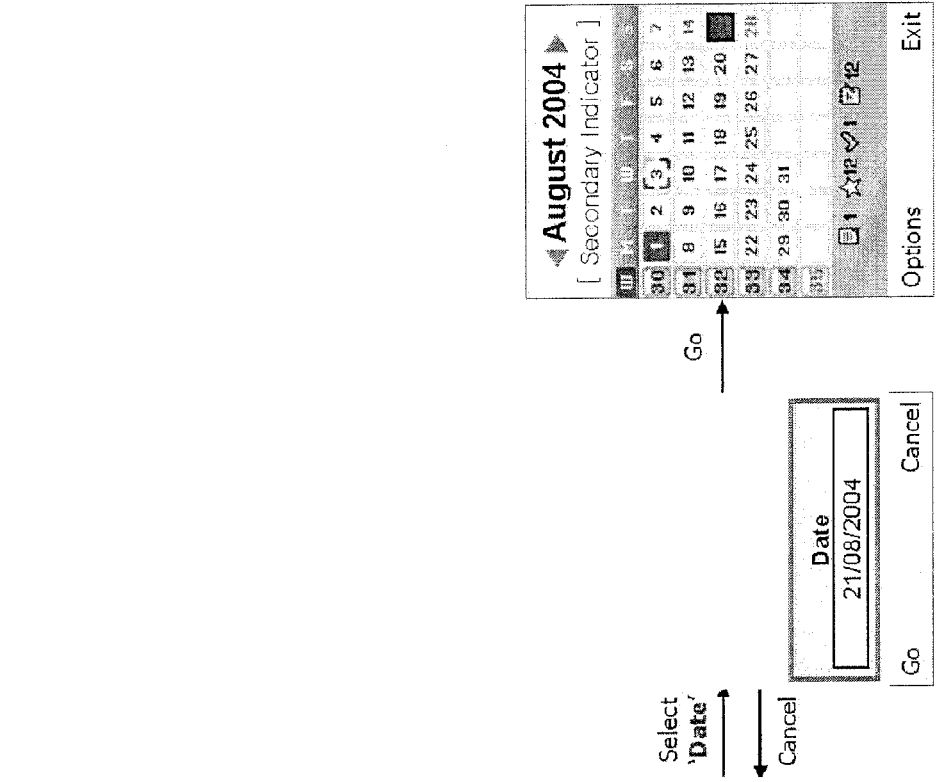
FIGS. 7A-7D illustrate a process of "Go to" in an exemplary wireless terminal according to an embodiment of the present invention.
Figures 7C, 7D:
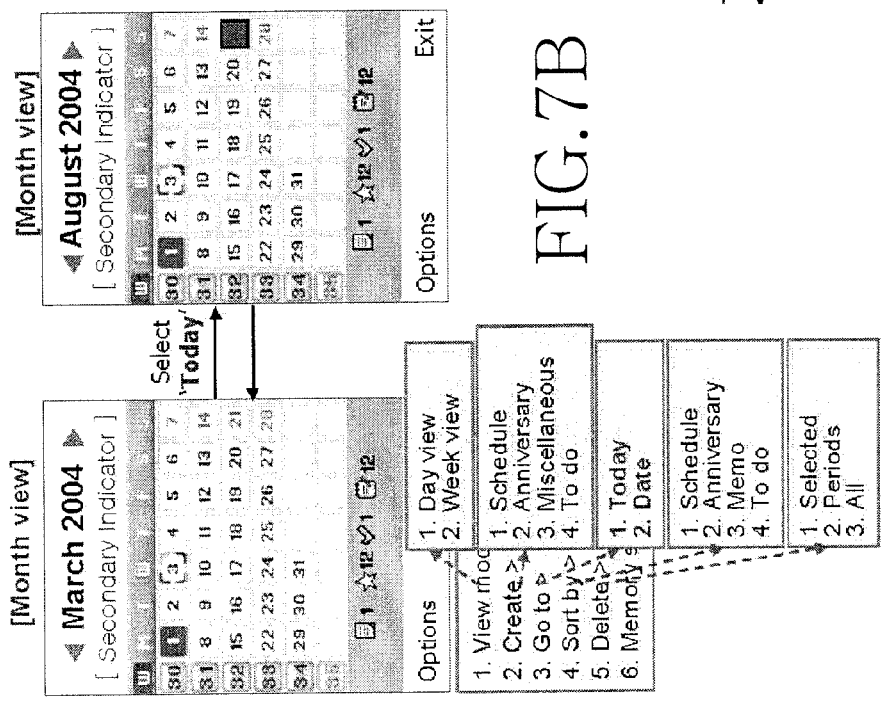

A process of "Go to" the corresponding date will now be described with reference to FIGS. 7A-7D. If "Go to Today" ("Go to"→"Today") is selected in the month view mode as shown in FIG. 7A, the controller 110 detects the selection of "Go to Today" and converts to a corresponding month view mode including today as shown in FIG. 7B. However, if "Go to date" ("Go to"→"Date") is selected in the month view mode, the controller 110 detects the selection of "Go to date" and converts to a mode for inputting a corresponding date where the "Go to" is to be executed, as shown in FIG. 7C. If the corresponding date is input in the date input mode, the controller 110 detects the input of the corresponding date and converts to the corresponding month view mode including the input corresponding date as shown in FIG. 7D.

FIGS. 8A-8D, FIGS. 9A-9D, FIGS. 10A-10D, and FIGS. 11A-11D illustrate processes of sorting the event information in an exemplary wireless terminal according to an embodiment of the present invention. FIGS. 8A-8D illustrate the process of "Sort by schedule" as the event information in an exemplary wireless terminal according to an embodiment of the present invention, FIGS. 9A-9D illustrate the process of "Sort by anniversary" as the event information in an exemplary wireless terminal according to an embodiment of the present invention, FIGS. 10A-10D illustrate the process of "Sort by memo" as the event information in an exemplary wireless terminal according to an embodiment of the present invention, and FIGS. 11A-11D illustrate the process of "Sort by TO-DO" as the event information in an exemplary wireless terminal according to an embodiment of the present invention.

A process of the "Sort by schedule" as the event information will now be described with reference to FIGS. 8A-8D. If "Sort by→Schedule" is selected in the month view mode as shown in FIG. 8A, the controller 110 detects the selection of the "Sort by→Schedule", and sorts and displays the registered schedule information by date as shown in FIG. 8B. If a corresponding schedule is selected from the schedule information sorted by date in FIG. 8B, the controller 110 detects the selection of the corresponding schedule and controls a function to display details of the selected corresponding schedule as shown in FIG. 8C. If the user selects "edit" from the details of the corresponding schedule displayed in FIG. 8C, the controller 110 detects the selection of the "edit" and converts to an edit mode of the selected corresponding schedule. Upon completion of edits of the corresponding schedule in the edit mode, the controller 110 detects the completion of the edits and converts to FIG. 8B, including the edited corresponding schedule and displays a menu of the corresponding schedule.

Next, a process of the "Sort by anniversary" as the event information will now be described with reference to FIGS. 9A-9D. If "Sort by→Anniversary" is selected in the month view mode as shown in FIG. 9A, the controller 110 detects the selection of the "Sort by→Anniversary", and sorts and displays anniversary information registered every day as shown in FIG. 9B. If a corresponding anniversary is selected from the anniversary information sorted by date in FIG. 9B, the controller 110 detects the selection of the corresponding anniversary and controls a function to display details of the selected corresponding anniversary as shown in FIG. 9C. If the user selects "edit" from the details of the corresponding anniversary displayed in FIG. 9C, the controller 110 detects the selection of the "edit" and converts to an edit mode of the selected corresponding anniversary. Upon completion of edits of the corresponding anniversary in the edit mode, the controller 110 detects the completion of the edits and converts to FIG. 9B, including the edited corresponding anniversary and displays a menu of the corresponding anniversary.

Next, a process of the "Sort by memo" as the event information will now be described with reference to FIGS. 10A-10D. If "Sort by→Memo" is selected in the month view mode as shown in FIG. 10A, the controller 110 detects the selection of the "Sort by→Memo", and sorts and displays memo information registered every day as shown in FIG. 10B. If a corresponding memo is selected from the memo information sorted by date in FIG. 10B, the controller 110 detects the selection of the corresponding memo and controls a function to display details of the selected corresponding memo as shown in FIG. 10C. If the user selects "edit" from the details of the corresponding memo displayed in FIG. 10C, the controller 110 detects the selection of the "edit" and converts to an edit mode of the selected corresponding memo. Upon completion of edits of the corresponding memo in the edit mode, the controller 110 detects the completion of the edits and converts to FIG. 10B, including the edited corresponding memo and displays a menu of the corresponding memo.

Next, a process of the "Sort by TO-DO" as the event information will now be described with reference to FIGS. 11A-11D. If "Sort by→To do" is selected in the month view mode as shown in FIG. 11A, the controller 110 detects the selection of the "Sort by→To do", and sorts and displays TO-DO information registered every day as shown in FIG. 11B. If a corresponding TO-DO item is selected from the TO-DO information sorted by date in FIG. 11B, the controller 110 detects the selection of the corresponding TO-DO item and controls a function to display details of the selected corresponding TO-DO item as shown in FIG. 11C. If the user selects "edit" from the details of the corresponding TO-DO item displayed in FIG. 11C, the controller 110 detects the selection of the "edit" and converts to an edit mode of the selected corresponding TO-DO item. Upon completion of edits of the corresponding TO-DO item in the edit mode, the controller 110 detects the completion of the edits and converts to FIG. 11B, including the edited corresponding TO-DO item and displays a menu of the corresponding TO-DO information.

FIGS. 12A-12E illustrate a process of sending event information in an exemplary wireless terminal according to an embodiment of the present invention.

The process of sending event information will now be described with reference to FIGS. 12A-12E. If the corresponding schedule is selected from the menu of the registered event information and then, "send via SMS" is selected as shown in FIG. 12A, the controller 110 detects the selection of the "send via SMS" and converts to a short message service (SMS) mode in which the selected corresponding schedule is attached as shown in FIG. 12B. However, if the corresponding schedule is selected from the menu of the registered event information and then, "send via MMS" is selected as shown in FIG. 12A, the controller 110 detects the selection of the "send via MMS" and converts to a multimedia messaging service (MMS) mode in which the selected corresponding schedule is attached in a file as shown in FIG. 12C. If the corresponding schedule is selected from the menu of the registered event information and then, "send via E-mail" is selected as shown in FIG. 12A, the controller 110 detects the selection of the "send via E-mail" and converts to an electronic mail (E-mail) mode in which the selected corresponding schedule is attached in a file as shown in FIG. 12C. If the corresponding schedule is selected from the menu of the registered event information and then, "send via Bluetooth" is selected as shown in FIG. 12A, the controller 110 detects the selection of the "send via Bluetooth" and converts to a Bluetooth mode for sending the selected corresponding schedule as shown in FIG. 12E.

Figure 13A:
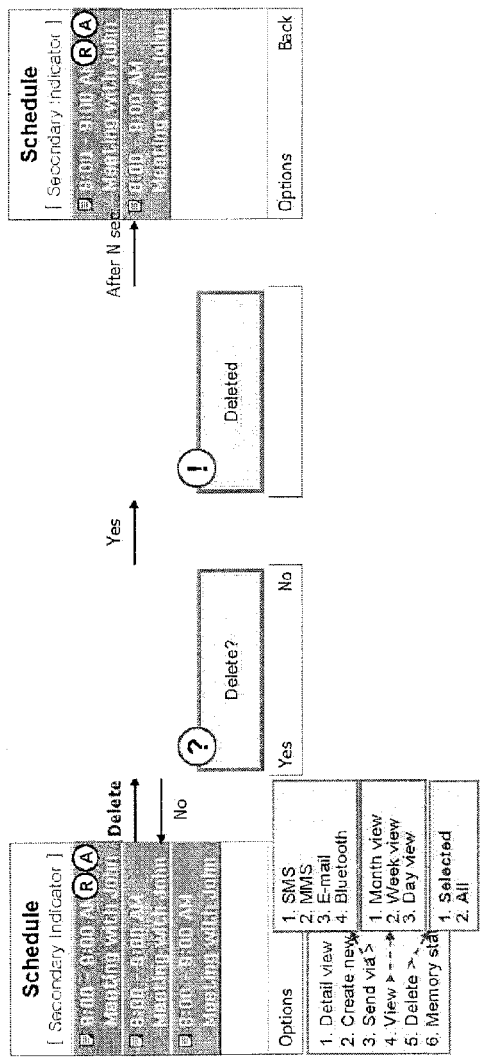
FIGS. 13A-13B illustrate a process of deleting event information in an exemplary wireless terminal according to an embodiment of the present invention.
Figure 13B:
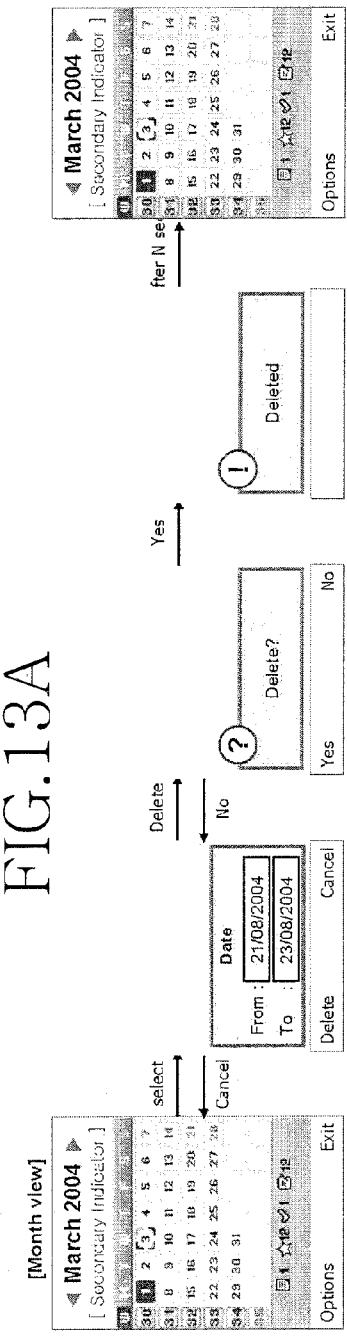

FIGS. 13A-13B illustrate a process of deleting event information in an exemplary wireless terminal according to an embodiment of the present invention.

The process of deleting the event information will now be described with reference to FIGS. 13A-13B. If the corresponding schedule is selected from the menu of the registered event information as shown in FIG. 13A and then, "delete" is selected, the controller 110 detects the selection of the "delete" and deletes the selected corresponding schedule. However, if "period" is selected from a menu of the "delete" in the month view mode as shown in FIG. 13B, the controller 110 detects the selection of the "period" and converts to a period input mode for deleting the menu of the registered event information within the period. If the period is input in the period input mode, the controller 110 detects the input of the period, deletes the menu of the registered event information within the input period, and converts to the month view mode. In the month view mode, the menu of the "delete" is provided as "Selected", "Period", and "All". In the week view mode, the menu of the "delete" is provided as "Selected", "Period", "This week", and "All". In the day view mode, the menu of the "delete" is provided as "Selected", "This week", and "All".

Accordingly, embodiments of the present invention provide a method for managing the event information in an exemplary wireless terminal, thereby providing an effect in that the wireless terminal user can manage a variety of event information such as schedules, anniversaries, memos, and TO-DO items, with simplicity and convenience.

While embodiments of the present invention have been shown and described with reference to certain exemplary embodiments thereof, it will be understood by those skilled in the art that various changes in form and details may be made therein without departing from the spirit and scope of the invention as defined by the appended claims.

What is claimed is:

1. A device for managing event information of a calendar in a mobile terminal, the device comprising:
- a display;
- a user input unit;
- a transceiver; and
- a controller configured to:
  - receive event information regarding a date through the user input unit or the transceiver;
  - process registration of at least one event corresponding to the event information, a kind of each of the at least one event being determined as one among a plurality of kinds of event based on the event information;
  - control the display to display at least one indicator which indicates that at least one event exists within a display area of a date on a month view of the calendar, and to display a list including events of a selected kind among the plurality of kinds of event according to a user input;
  - generate a file, to be attached to an electronic mail, including selected event information in response to a user request for sending the selected event information to an another device; and
  - control the transceiver to send the electronic mail with the attached file to the another device.

2. The device of claim 1, wherein the controller is further configured to control the display to display a plurality of event identifiers in a month which is displayed on the month view of the calendar, each of the plurality of event identifiers corresponding to one of the plurality of kinds of event, the event identifiers being visually distinguished according to the plurality of kinds of event.

3. The device of claim 2 wherein the plurality of kinds of event comprises at least two of a schedule, an anniversary, a memo, and a TO-DO item.

4. The device of claim 3, wherein the identifier corresponding to the anniversary event comprises an image of a cake.

5. The device of claim 1, wherein the at least one indicator within the display area of the date is visually distinguished according to the kinds of events of the date.

6. The device of claim 1, wherein the controller is further configured to create To-Do events in the calendar and wherein the controller is further configured to control the display to display a list of To-Do events and to control the transceiver to send at least one To-Do events to the another device.

7. The device of claim 1, wherein the device in the mobile terminal supports cellular communication.

8. The device of claim 1, wherein the electronic mail with the attached file is sent by cellular communication.

9. The device of claim 1, wherein the controller is further configured to control the display unit to display at least one of a day view, a month view, and a week view according to a user input.

10. The device of claim 1, wherein a week view of the calendar is displayed in a form of a time table, and at least two events are displayed in different colors according to a kind of the at least two events in the week view.

11. A device for managing event information of a calendar in a mobile terminal, the device comprising:
- a display;
- a user input unit;
- a transceiver; and
- a controller configured to:
  - receive event information regarding a date through the user input unit or the transceiver;
  - process registration of at least one event corresponding to the event information, a kind of each of the at least one event being determined as one among a plurality of kinds of event based on the event information;
  - control the display to display at least one indicator which indicates that at least one event exists within a display area of a date on a month view of the calendar, and to display a list including events of a selected kind among the plurality of kinds of event according to a user input;
  - generate a file, to be attached to an electronic mail, including selected event information in response to a user request for sending the selected event information to an another device; and
  - control the transceiver to send the electronic mail with the attached file to the another device,
- wherein the device in the mobile terminal supports cellular communication,
- wherein the electronic mail with the attached file is sent by cellular communication,
- wherein the controller is further configured to control the display unit to display at least one of a day view, a month view, and a week view according to a user input,
- wherein the week view of the calendar is displayed in a form of a time table, and at least two events are displayed in different colors according to a kind of the at least two events in the week view.

12. The device of claim 11, wherein the controller is further configured to control the display to display a plurality of event identifiers in a month which is displayed on the month view of the calendar, each of the plurality of event identifiers corresponding to one of the plurality of kinds of event, the event identifiers being visually distinguished according to the plurality of kinds of event.

13. The device of claim 12, wherein the plurality of kinds of event comprises at least two of a schedule, an anniversary, a memo, and a TO-DO item.

14. The device of claim 13, wherein the identifier corresponding to the anniversary event comprises an image of a cake.

15. The device of claim 11, wherein the at least one indicator within the display area of the date is visually distinguished according to the kinds of events of the date.

16. The device of claim 11, wherein the controller is further configured to create To-Do events in the calendar and wherein the controller is further configured to control the display to display a list of To-Do events and to control the transceiver to send at least one To-Do events to the another device.

17. A device for managing event information of a calendar in a mobile terminal, the device comprising:
- a display;
- a user input unit;
- a transceiver; and
- a controller configured to:
  - receive event information regarding a date;
  - process registration of at least one event corresponding to the event information, a kind of each of the at least one event being determined based on the event information;
  - control the display to display at least one indicator which indicates that the at least one event exists within a display area of the date on the calendar; and
  - control the transceiver to transmit the at least one event to another device via an electronic mail if a user request for sending the at least one event to the another device is received.

18. A method for managing event information of a calendar in a mobile terminal, the method comprising:
- receiving event information regarding a date;
- processing registration of at least one event corresponding to the event information, a kind of each of the at least one event being determined based on the event information;
- displaying at least one indicator which indicates that the at least one event exists within a display area of the date on the calendar; and
- transmitting the event information to another device via an electronic mail if a user request for sending the event information to the another device is received.

\* \* \* \* \*